United States Patent [19]

Mueller et al.

[11] 4,188,443
[45] Feb. 12, 1980

[54] MULTI-LAYER POLYESTER/POLYOLEFIN SHRINK FILM

[75] Inventors: Walter B. Mueller, Taylors; Henry G. Schirmer, Spartanburg; Julian H. Schoenberg; Alan S. Weinberg, both of Greenville, all of S.C.

[73] Assignee: W. R. Grace & Co., Duncan, S.C.

[21] Appl. No.: 938,191

[22] Filed: Aug. 30, 1978

[51] Int. Cl.² .................. B65D 65/02; B32B 31/28; B32B 27/36; B32B 27/32

[52] U.S. Cl. ........................... 428/216; 229/3.5 R; 229/87 F; 426/412; 428/335; 428/339; 428/483; 428/516; 428/518; 428/520; 428/523; 428/910

[58] Field of Search .......... 428/339, 335, 480, 483, 428/520, 522, 523, 516, 518, 910, 215, 216; 426/412; 229/3.5 R, 87 F

[56] References Cited

U.S. PATENT DOCUMENTS

| | | | |
|---|---|---|---|
| Re. 28,554 | 9/1975 | Curler et al. | 428/520 X |
| 2,876,067 | 3/1959 | Nagel et al. | 428/483 X |
| 3,017,302 | 1/1962 | Hultkrans | 156/244.24 X |
| 3,188,265 | 6/1965 | Charbonneau et al. | 428/483 X |
| 3,285,766 | 11/1966 | Barkis et al. | 428/516 X |
| 3,547,754 | 12/1970 | Tokos et al. | 229/3.5 R |
| 3,925,591 | 12/1975 | Breitenfellner | 428/339 X |
| 4,041,206 | 8/1977 | Tsunashima et al. | 428/482 X |
| 4,048,428 | 9/1977 | Baird et al. | 428/520 X |
| 4,101,699 | 7/1978 | Stine et al. | 428/523 X |
| 4,117,193 | 9/1978 | Tsuchna et al. | 428/339 |
| 4,127,688 | 11/1978 | Bieler et al. | 428/520 X |
| 4,132,050 | 1/1979 | Young | 428/516 |
| 4,133,924 | 1/1979 | Seino et al. | 428/910 X |
| 4,147,827 | 4/1979 | Breidt et al. | 428/910 X |

*Primary Examiner*—Harold Ansher
*Attorney, Agent, or Firm*—John J. Toney; William D. Lee, Jr.; John B. Hardaway

[57] ABSTRACT

The multi-layer polyester/polyolefin shrink film of this invention provides a combination of shrink tension, hot seal strength, sealability, and shrink temperature range heretofore unobtainable in an oriented, monolayer polyolefin material. The preferred film has five layers in which the middle layer comprises a polyester or copolyester, two inner layers adjacent the middle layer comprise ethylene-vinyl acetate copolymer, and the skin or outer layers comprises an ethylene-propylene copolymer.

11 Claims, No Drawings

MULTI-LAYER POLYESTER/POLYOLEFIN SHRINK FILM

FIELD OF THE INVENTION

This invention relates to heat shrinkable, thermoplastic packaging films; and in particular, this invention relates to a multilayer, polyolefin shrink film having a polyester or copolyester layer.

BACKGROUND OF THE INVENTION

The polyolefins and polyvinyl chlorides can be considered to be the two major families of plastic resins from which the bulk of commercially available shrink films for wrapping purposes are made. Other resin families from which shrink films can be made include the ionomers, polyesters, polystyrenes, and polyvinylidene chlorides. The shrinkable polyolefins currently on the market are mainly monolayer films which include both cross-linked and uncross-linked oriented polyethylene, oriented polypropylene, and oriented ethylene-propylene copolymers. The polyvinyl chloride (hereinafter "PVC") shrink films are monolayer films consisting of a variety of formulations of polyvinyl chloride.

A shrink film's distinguishing characteristic is its ability upon exposure to some level of heat to shrink or, if restrained, to create shrink tension within the film. This ability is activated by the packager when the wrapped product is passed through a hot air or hot water shrink tunnel. This process causes the film to shrink around the product producing a tight, transparent wrapping that conforms to the contour of the product and which is aesthetically pleasing while providing the useful functions required of packaging materials such as protection of the product from loss of components, pilferage, damage due to handling and shipment, dirt and contamination. Typical items wrapped in PVC or polyolefin shrink films are toys, games, sporting goods, stationery, greeting cards, hardware and household products, office supplies and forms, foods, phonograph records, and industrial parts.

The manufacture of shrink films requires sophisticated equipment including extrusion lines with "orientation" capability, irradiation units when cross-linking is desired, tenter frames, mechanical centerfolders, and slitters. "Racking" or "tenter framing" are orientation processes which cause the material to be stretched in the cross or transverse direction and in the longitudinal or machine direction. The films are usually heated to their orientation temperature range which varies with the different polymers but is usually above room temperature and below the polymer's melting temperature. After being stretched, the film is rapidly cooled to quench it thus freezing the molecules of the film in their oriented state. Upon heating, the orientation stresses are released and the film will begin to shrink back to its original, unoriented dimension.

The PVC and polyolefin families of shrink films provide a wide range of physical and performance characteristics such as shrink force (the amount of force that a film exerts per unit area of its cross-section during shrinkage), the degree of free shrink (the reduction in surface area a material undergoes when unrestrained), tensile strength (the highest force that can be applied to a unit area of film before it begins to break), sealability, shrink temperature curve (the relationship of shrink to temperature), tear initiation and resistance (the force at which a film will begin to tear and continue to tear), optics (gloss, haze and transparency of material), and dimensional stability (the ability of the film to retain its original dimensions under all types of storage conditions). Film characteristics play an important role in the selection of a particular film and may differ for each type of packaging application and for each packager. Consideration must be given to the product's size, weight, shape, rigidity, number of product components, other packaging materials which may be used along with the film, and the type of packaging equipment available.

Polyolefins have been most successful with applications where moderate to high shrink tensions are preferred; and, on new, automatic, high speed shrink wrapping equipment where shrink and sealing temperature ranges are more closely controlled. The polyolefins tend to be cleaner leaving fewer deposits and less residue thereby extending the life of the equipment and reducing equipment maintenance. The PVC films generally have better optics, lower shrink tensions, and will seal with greater strength at elevated temperatures and shrink over much broader temperature ranges than the polyolefins. Polyolefins usually do not emit corrosive gases upon sealing as do PVC films and, in this respect, are also cleaner than PVC films.

Heretofore, polyolefins have not been able to penetrate PVC film packaging applications where the products to be packaged require the lower shrink tensions of the PVC film because the products are too fragile for use with polyolefins which possess shrink tensions up to four times those of the PVC films. PVC film is also the shrink film of choice for older, manually operated sealers and semi-automatic wrappers where temperatures are highly variable. Older, poorly maintained wrapping equipment of any type usually runs PVC better than present monolayer polyolefins due to the combination of the generally broader shrink and sealing temperature ranges of the PVC films. In addition, products with sharp or pointed extensions will often require PVC due to the high initial tear resistance of the PVC film relative to that of the polyolefins, i.e. it takes about 7 grams of force to propagate a tear in PVC whereas only 2 to 3.5 grams of force are necessary to propagate a tear in a typical monolayer polyolefin shrink film.

Accordingly, it is a general object of the present invention to provide a shrinkable polyolefin film that will have many of the desirable qualities of PVC films and will overcome many of PVC's limitations.

Specifically, it is an object of the present invention to provide a polyolefin film having shrink tensions approximating those of PVC films and also providing good optical qualities, a wide shrink temperature range, sealability, resistance to tear propagation, and hot seal strength greater than that of prior art polyolefin films.

In addition, it is an object of the present invention to provide a polyolefin film which has none of the undesirable qualities of PVC films such as noxious odors and corrosive by-products.

Furthermore, it is an object of this invention to produce a multi-layer film having very thin layers of polyester or copolyester.

These and other objects are achieved by the multi-layer polyester/polyolefin shrink film which is disclosed herein.

SUMMARY OF THE INVENTION

It has been surprisingly discovered that a flexible thermoplastic packaging film having a combination of shrink tension, optical clarity, hot seal strength, sealability, shrink temperature range, and tear resistance heretofore unobtainable in a monolayer polyolefin film is achieved by the multi-layer, flexible, thermoplastic, packaging film of the present invention. This multi-layer film has at least three layers and at least one of the inner layers comprises a homopolymer, copolymer, or terpolymer of ethylene and at least one of the other layers comprises a polyester or copolyester. An alternate composition for the inner layer may comprise a blend, a major constituent of which is a polymer of ethylene and a minor constituent of which is either a homopolymer or copolymer of butylene. The multi-layer film is stretch oriented so that it exhibits the properties of an oriented film and is heat shrinkable in at leaast one direction.

In one aspect, the present invention is a five layer film in which the center or middle layer comprises a polyester or copolyester and an inner layer is on both sides of the middle layer, the inner layers comprising a copolymer or terpolymer of ethylene, preferably ethylene-vinyl acetate copolymer. Either one or both of the outer or skin layers is a polyester, copolyester, polyethylene, cross-linked polyethylene or cross-linked ethylene-vinyl acetate copolymer or homopolymer or copolymer of propylene.

In another aspect, the present invention is a process for making a multi-layer, flexible, thermoplastic packaging film comprising the steps of coextruding an inner layer of ethylene-vinyl acetate copolymer between two skin layers, one or both of which is a polyester or copolyester, to form a multi-layer film; and, stretching said multi-layer film to orient same.

DEFINITIONS

Unless specifically set forth and defined or limited, the term "polymer" as used herein generally includes homopolymers, copolymers, terpolymers, block, graft polymers, random, and alternating polymers.

The term "melt flow" as used herein or "melt flow index" is the amount, in grams, of a thermoplastic resin which can be forced through a given orifice under a specified pressure and temperature within 10 minutes as described in ASTM D 1238.

The term "oriented" or "orientation" as used herein means the alignment of the molecules of a polymer in one or more directions. Such films exhibit moderate to high shrink tension when heated to their orientation temperature range. As used herein, a "low" shrink tension exhibited by substantially unoriented film is a shrink tension of less than about 100 p.s.i. "Moderate" shrink tension is the range from about 100 to 400 p.s.i., and "high" shrink tension is the range from about 400 to 1000 p.s.i. Films having "moderate" or "high" shrink tensions in at least one direction are considered to be "oriented" films.

The term "inner layer" as used herein means a layer in a multi-layer film which is enclosed on both sides by other layers. An "inner" layer will be the center layer only in a three layer structure.

The "middle" layer is the center layer in a structure having five or more layers and will generally comprise a polyester or copolyester.

The term "hot blown" as used herein means that the material referred to has been stretched and has low shrink tension as defined above. Normally these films are prepared by stretching at or above melting temperature range so that the stretching has induced a minimum of stresses and molecular orientation.

"Skin" layers are outer layers and will normally be oriented.

The term "polyester" as used herein means thermoplastic, film-forming, saturated polyesters such as polyethylene terephthalate or polybutylene terephthalate. The term "polyester" as used herein also includes the film forming polycarbonates.

The term "copolyester" as used herein means a thermoplastic, film-forming copolyester such as ethylene terephthalate-glycol, terephthalic/isophthalic acid-cyclohexanedimethanol, and butyleneterephthalate-tetramethylene ether terephthalate. The polyester and copolyester resins are available from suppliers such as Eastman Kodak Company, DuPont Company, Goodyear Tire and Rubber Company, and Celanese Plastics Company.

The term "cross-linked" as used herein means that bonds have been formed between the molecules of the particular polymer. Cross-linking of some polymers can be induced by subjecting them to ionizing radiation such as gamma or X-rays or electrons or beta particles. For cross-linkable polymers such as polyethylene or ethylene-vinyl acetate copolymer, the irradiation dosage level can be related to the degree of cross-linking by considering the insoluble gel, i.e. the portion of the polymer which will not dissolve in a solvent such as boiling toluene, to be the cross-linked portion of the irradiated polymer. Usually there is no measurable gel for radiation dosages of less than 0.5 megarad. For the aforementioned polymers little increase in cross-linking is noted above 12 megarad. Cross-linking partially at intermediate dosage levels can have beneficial effects such as increasing the toughness and strength of the polymer without reducing its flowability to an undesirable extent.

The term "polybutylene" refers to high molecular weight isotactic polymers synthesized from butene-1 monomer.

PRIOR ART STATEMENT

Closely related patents from the prior art are listed and discussed briefly in the paragraphs which follow.

(1) U.S. Pat. No. 3,017,302 issued to P. B. Hultkrans on Jan. 16, 1962 and discloses a commodity wrapper comprising a ply of heat-shrinkable polyester film and a ply of heat sealable material of lower melting point such as polyethylene or polypropylene.

(2) U.S. Pat. No. 3,925,591 issued on Dec. 9, 1975 to Franz Breitenfellner et al and discloses a deep drawable film laminate having an unstretched layer of polyester bonded to an unstretched layer of polyethylene with an ethylene-vinyl acetate copolymer as an adhesion promotor.

(3) U.S. Pat. No. 4,041,206 issued on Aug. 9, 1977 to Kenji Tsunashima et al and discloses a polyester film having a base layer of biaxially oriented polyethylene terephthalate or polybutylene terephthalate which base layer is laminated directly by heat sealing to a blended copolyester layer.

PREFERRED EMBODIMENT

In the description and examples which follow, the term, "ethylene-vinyl acetate copolymer," will be designated as "EVA" and the term, "ethylene-propylene copolymer," will be designated as "EP." The "EP" copolymer is a particularly preferred copolymer of polypropylene. The homopolymers of propylene could also be used as well as blends of isotactic and atactic polypropylene to achieve a desired atactic/isotactic ratio.

EXAMPLE 1

A preferred embodiment of the present invention is a multi-layer film having the following layer configuration:

EP/EVA/copolyester/EVA/EP.

This five ply structure is prepared by employing three extruders to feed a circular coextrusion die so that each layer is extruded as an annulus. One extruder feeds a melt of EP having about 3% ethylene to the extrusion die to form the inner and outer layers or annular rings. A second extruder provides molten EVA with a vinyl acetate content of approximately 12% and a melt index of about 0.3 to the extrusion die to provide an annular layer of EVA adjacent the inner EP layer and adjacent the outer EP layer. The middle layer which is between the two EVA layers is supplied by a third extruder which provides a molten copolyester which, in this embodiment, is ethylene terephthalate-glycol. This five ply or layer tube as it leaves the extruder is often designated as the "tape" and, in this embodiment, the total wall thickness of the tubular tape is 16 mils with the copolyester providing 20% of the thickness, the EVA layers providing 47% of the thickness and the EP providing 33% of the thickness.

After leaving the extruder the tape is rapidly cooled to room temperature and below, preferably to about 10° C. in a water bath, collapsed by pinch rollers, inflated, and heated to a temperature in the range of 110° C. to 135° C. which is above the melt temperature of the EVA and in the orientation temperature range of the copolyester and the EP. Generally, the orientation temperatures for multi-layer films of this invention will be in the range from 80° C. to 200° C. As the inflated tube is heated into this temperature range it will expand into a bubble under the influence of the internal air pressure thereby biaxially stretching the tube. In this embodiment, the tube expands until a wall thickness of 0.75 mils is obtained and then the bubble is cooled by impinging chilled air on the surface thereof to quench the polymeric materials and set the molecular structure of the materials in their oriented state. Next, the bubble is collapsed and the expanded tube is slit to form packaging film.

The multi-layer film can be stretched to the desired degree of thinness which depends upon the specific packaging application for which the film is intended. The practical lower limit to which films of this invention can be stretched is about 0.1 mil and the upper useful limit is about 2.0 mil.

The multi-layer film prepared by the foregoing process was used to wrap 8"×10"×1" gift boxes by a conventional "L" bar sealer where a sheet of the film is folded over the box and sealed and severed on the remaining three sides. In this type of sealer, the leading seal for one package is the trailing seal for the package immediately in front and the package is advanced by pushing against the film in the area of the still hot seal. Thus, hot seal strength is important in order to maintain package integrity and packaging line speed.

After the gift boxes were packaged in the film they were sent through a shrink tunnel and heated to approximately the temperature range at which the film was oriented. Upon leaving the tunnel the packages are considered to be "finished." All of the packages wrapped in the film of this embodiment had excellent appearance, did not tend to exert excessive shrink force upon the thin walled gift boxes so as to distort them, displaced good hot seal strength and good sealability and cutability. In all instances, the film of this embodiment performed as well as commercially available PVC film under the same conditions.

Alternate embodiments of the present invention are described in the following examples:

EXAMPLE 2

A second multi-layer film was prepared in the same manner as the preferred embodiment except that the middle layer of copolyester comprised 18% of the total film thickness, the inner layers of EVA together comprised 52% and the outer layers of EP comprised 30%. This film was also stretched to a thickness of about 0.75 mil. Tensile strength and tear resistance were somewhat lowered as was also maximum shrink tension but overall properties were very satisfactory and comparable to those of PVC.

EXAMPLE 3

A five layer film was prepared using the same process as used to prepare the film of the preferred embodiment, Example 1 above, and the same materials were also used, the only difference being that the central copolyester layer comprised 9.5% of the total multi-ply structure thickness, the EVA layers comprised 57%, one EP layer comprised 19% and the other 14.5% with the total thickness being 1.0 mil. In packaging tests similar to those above, this film exhibited lower, but satisfactory, hot seal strength and its shrink tension was also lower.

In general, based on work done with this five layer structure, satisfactory films can be made wherein the copolyester layer comprises 5 to 25% of the total structure thickness, the EP layers comprise 10 to 50% of the thickness, and the EVA layers comprise 25% to 85% of the total thickness.

The EVA in Example 1, the preferred embodiment, having 12% vinyl acetate and a melt index of 0.3 is a preferred EVA for that structure. EVA's containing 4 to 18% vinyl acetate with melt index ranges of 0.1 to 6.0 performed satisfactorily in the multi-layer films of the present invention. Likewise, the EP in the preferred embodiment has about 3.0% random ethylene but EP copolymers containing 2.0 to 4.0 having melt flow ranges of 0.5 to 6.0 will perform satisfactorily. In addition, the polyesters and copolyesters listed in the definitions perform satisfactorily in the multi-layer films of this invention.

A comparison of the shrink properties of the films of the first three examples with polyvinyl chloride (PVC), polypropylene (PP), and cross-linked polyethylene (PE) is shown in the table below.

TABLE I

| Film | Shrink Tension Range (PSI) (200° F. to 300° F.) | |
|---|---|---|
| [1]PVC | 160 | 260 |
| Ex. 1 | 285 | 390 |
| Ex. 2 | 295 | 330 |
| Ex. 3 | 190 | 250 |
| [2]PP | 440 | 710 |
| [3]PE | 350 | 420 |

[1]"Reynolon 4155" sold by Reynolds Metals Corporation
[2]Ethylene-propylene film, predominately propylene, sold by W. R. Grace & Co. as "CP-900."
[3]Cross-linked polyethylene sold by W. R. Grace & Co. as D-Film ®.

Noticeably, the shrink tension ranges of the films of Examples 1-3 are lower than those of straight polyolefins such as the polypropylene and polyethylene films and approach those of PVC. The films of Examples 1-3 also exhibit sufficient hot seal strength for high speed packaging operations. The optical properties and appearance of packages made from the films of Examples 1-3 were excellent.

EXAMPLE 4

Based on the work done in the foregoing examples, a five layer film having the following structure may be coextruded:

Polyester/EVA/Polyester/EVA/EP.

In this configuration, the polyester or copolyester layers will comprise 10 to 50% of the thickness of the total structure, the EVA layers will comprise 10 to 50% of the thickness, and the EP layer will comprise 5 to 25% of the structure. This five layer film is desirable where additional polyester content is needed for more hot seal strength and one of the surfaces of the film needs the hardness and scratch resistance provided by the polyester.

EXAMPLE 5

Another five layer film which can be made according to the preferred embodiment is one having a layer structure as follows:

Polyester/EVA/EP/EVA/Polyester

The polyester or copolyester will comprise 10 to 50% of the total film thickness, the EVA layers will comprise 10 to 85% of the thickness and the EP layer will comprise 5 to 80% of the thickness. This configuration is desirable where the hardness and scratch resistance of the polyester on both surfaces of the film is desirable and the additional polyester content is needed for more hot seal strength.

EXAMPLE 6

A three layer film was coextruded using a process similar to that described in the preferred embodiment. Three extruders were necessary as the same three materials were used and the circular coextrusion die was set up so that the EVA layer was the central or middle layer. The structure was as follows:

EP/EVA/Copolyester.

This three layer film was biaxially stretched to a thickness of 0.75 mils so that the two outer layers had thicknesses of 0.15 mils and the middle layer had a thickness of 0.45 mils. Gift boxes were wrapped in the three layer film as was done in the preferred embodiment but this film tended to be less satisfactory because of its unbalanced nature, i.e. the EP layer and the copolyester layer have different shrink properties so that a curl developed in the film. The curl tended to curl inwardly on the copolyester side so that the copolyester face was on the inside of the curl. In some applications such a curl may be desirable such as where bags are made from the film and a curl at the mouth or lip of the bag will enhance bag openability.

EXAMPLE 7

A balanced three ply film can be made having the following structure:

Polyester/EVA/Polyester.

Copolyester can, of course, be substituted for the polyester and, in this structure, the polyester layers will comprise 10 to 50% of the thickness of the structure and the EVA layer will comprise 50 to 90% of the structure. The total thickness of this film, as with the foregoing films is preferably in the range of 0.4 to 1.5 mil.

EXAMPLE 8

Another five layer structure which can be made according to the process of this invention is the following:

PE/EVA/Polyester/EVA/PE.

The abbreviation "PE" designates polyethylene which, as desired, may be low, medium, or high density and when low or medium density polyethylene is used the additional strength imparted by cross-linking may be needed. The middle layer may be polyester as shown or may be copolyester.

In each of the foregoing described multi-layer films the EVA layer which is substantially unoriented acts as a damper to retard or moderate the relatively high shrink tensions of the polyester or EP layers. Without this moderating effect, the shrink tension in the film would be great enough to distort the packaged product in many packaging applications. This allows the desirable shrink tensions of a PVC film to be approximated for these applications. As a substitute for the EVA layers, a blend of the EP resin with polybutylene or a copolymer of butylene may be used where the EP constituent is the major portion of the blend and the butylene polymer is the minor portion of the blend. Another suitable substitute for EVA or for blending therewith is the ethylene terpolymer, or modified EVA, which is sold under the brand name "Plexar 3" by the Chemplex Co. or the commercially available terpolymer of ethylene having 28% vinyl acetate and 4% to 8% by weight methacrylic acid.

Irradiation of the multi-layer films according to this invention increases their strength and toughness. Irradiation to dosage levels in the range of 1.0 megarad to 4.0 megarad gives the most desirable combination of an increase in strength without a significant reduction in flowability that would inhibit sealing.

Having thus described our invention, we claim:
1. A heat shrinkable, multi-layer, flexible, thermoplastic packaging film comprising:
 (a) at least three layers of polymeric material;
 (b) at least one of said layers being an inner layer and comprising a polymer selected from the group consisting of: (i) homopolymers, copolymers, and terpolymers of ethylene and (ii) blends of ethylene homopolymers or copolymers with butylene homopolymers or copolymers, said inner layer comprising 50% to 90% of the total thickness of said laminate;

(c) another of said layers comprising a polymer selected from the group consisting of polyesters and copolyesters, said layer being stretch oriented;

(d) said multi-layer film having shrink tension in the range from 100 to about 400 p.s.i.; and, (e) said film having a total thickness in the range between 0.1 mil and 2.0 mil.

2. The film of claim 1 wherein at least one layer has been cross-linked by ionizing radiation.

3. The multi-layer film of claim 1 wherein said inner layer comprises about 47% to 90% of the total thickness of said multi-layer film.

4. The multi-layer film of claim 3 including a layer comprising a polymer selected from the group consisting of homopolymers and copolymers of propylene.

5. The film of claim 1 wherein the polymer selected from the group consisting of copolymers and terpolymers of ethylene is ethylenevinyl acetate copolymer having 4 to 18% vinyl acetate with a melt flow range of 0.1 to 6.0.

6. The film of claim 5 wherein said polymer is ethylene-propylene copolymer having from about 2% to about 4% ethylene content with a melt flow in the range from about 0.5 to about 6.0.

7. A three layer, heat shrinkable, flexible, thermoplastic packaging film comprising:

(a) an inner layer comprising a polymer selected from the group consisting of film forming copolymers and terpolymers of ethylene which have a melt flow in the range of 0.1 to 6.0, said layer comprising 25% to 90% of the total thickness of said film;

(b) the outer layers comprising a polymer selected from the group consisting of polyesters and copolyesters, said outer layers comprising 75% to 10% of the total film thickness, said outer layer being stretch oriented; and, (c) said film having shrink tension in the range of about 100 p.s.i. to about 400 p.s.i. and having a thickness in the range of 0.1 mil to 2.0 mil.

8. The three layer film of claim 7 wherein the polymer of the inner layer is ethylene-vinyl acetate copolymer having 4% to 18% vinyl acetate content by weight.

9. The film of claim 7 wherein at least one layer has been cross-linked by ionizing radiation.

10. A five layer, heat shrinkable, flexible, thermoplastic packaging film comprising:

(a) a middle layer comprising a polymer selected from the group consisting of polyesters, copolyesters, and propylene homopolymers and copolymers, said layer being stretch oriented;

(b) two inner layers, each of said inner layers being on opposed sides of said middle layer and each inner layer comprising a polymer selected from the group consisting of: ethylene homopolymers, copolymers, terpolymers and blends of said ethylene homopolymers or copolymers with butylene homopolymers or copolymers, and said two inner layers comprising together between 10% and 85% of the total thickness of said five layer film;

(c) two outer layers, each of said outer layers being adjacent one of said inner layers, and at least one outer layer comprising a polymer selected from the group consisting of polyesters and copolyesters; and, (d) said film having a shrink tension in the range between about 100 p.s.i. and about 400 p.s.i. and said film being between 0.1 mil and 2.0 mil in total thickness.

11. The five layer film of claim 10 wherein said inner layers comprise ethylene-vinyl acetate copolymer having 4% to 18% vinyl acetate content by weight.

* * * * *